G. W. BROWN.

CORN PLANTER.

No. 10,180. Reissued Aug. 15, 1882.

WITNESSES
T. C. Brecht,
Geo. H. Gameborn.

INVENTOR
George W. Brown,
By John R. Bennett
Attorney

N. PETERS, Photo-Lithographer, Washington, D. C.

2 Sheets—Sheet 2.

G. W. BROWN.

CORN PLANTER.

No. 10,180. Reissued Aug. 15, 1882.

WITNESSES:
T. C. Bracht
Geo. H. Gonnebom

INVENTOR
George W. Brown,
By John R. Bennett
Attorney

N. PETERS, Photo-Lithographer, Washington, D. C.

UNITED STATES PATENT OFFICE.

GEORGE W. BROWN, OF GALESBURG, ILLINOIS.

CORN-PLANTER.

SPECIFICATION forming part of Reissued Letters Patent No. 10,180, dated August 15, 1882.

Original No. 253,580, dated February 14, 1882. Application for reissue filed June 15, 1882.

*To all whom it may concern:*

Be it known that I, GEORGE W. BROWN, of Galesburg, in the county of Knox and State of Illinois, have invented a new and useful Improvement in Corn-Planters, of which the following is a specification, reference being had to the accompanying drawings, which form part of this specification.

My invention relates to that class of corn-planters having a horizontally-rotating seed-wheel in each of the two hoppers, said seed wheels or disks having an intermittent rotary motion imparted to them by means of a reciprocating bar and lever, the reciprocating bar and seed-disks being so constructed and combined that one seed-disk only is given an impulse by each alternate throw of the reciprocating bar, and remains stationary during the alternate throws thereof.

My invention consists, first, in so constructing and combining a cut-off slide with a horizontally-rotating seed-disk and reciprocating bar that at each movement of the reciprocating bar a single seed-cup is discharged, while the seed-disk is given an impulse at each alternate movement of the reciprocating bar only, remaining stationary during the alternate throws thereof; second, in a cut-off slide and horizontally-rotating seed-disk so constructed and combined that at each impulse given to the seed-disk by the reciprocating bar two seed-cups are brought directly over the place of discharge, only one of which is discharged, the remaining cup being discharged by the return movement of the reciprocating bar; third, in so constructing and combining a cut-off slide, horizontally-rotating seed-disk, reciprocating bar, and valve in the seed-tube that while the seed-disk is given an impulse at each alternate throw of the reciprocating bar only, the cut-off slide and valve are vibrated or oscillated simultaneously at each movement or throw of the bar, thereby causing a single seed-cup to be discharged into the seed-tube and a charge of seed to be discharged from the seed-tube into the ground simultaneously at every throw of the reciprocating bar.

Figure 1:
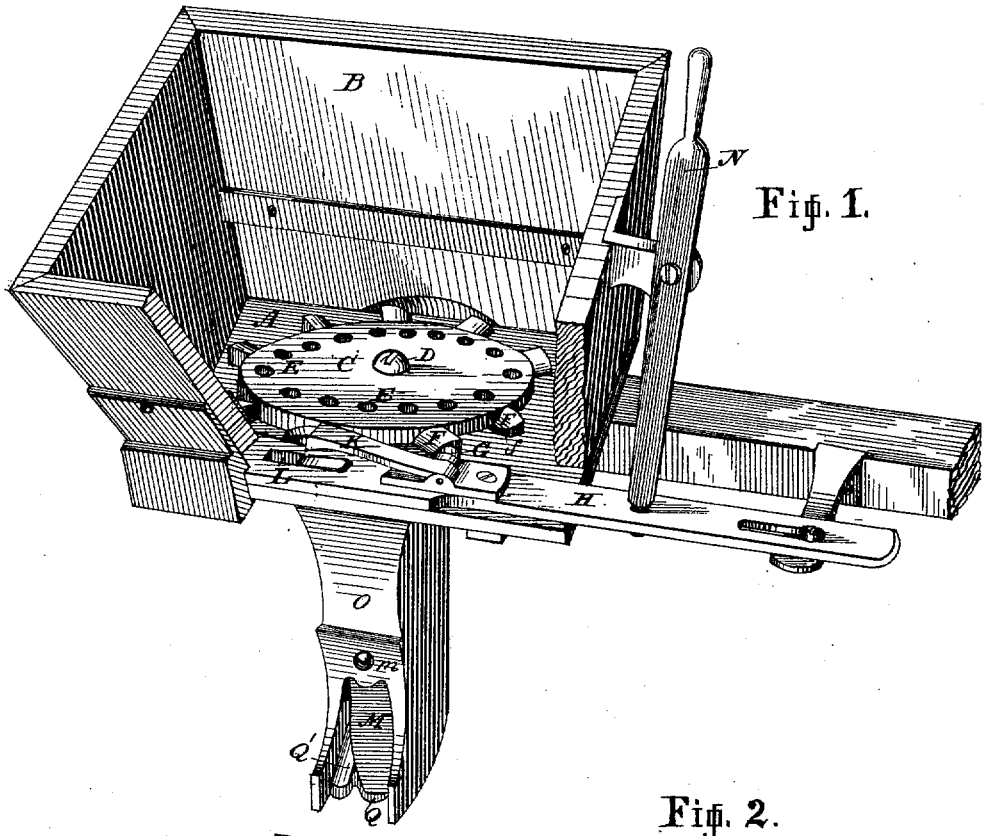
Figure 2:
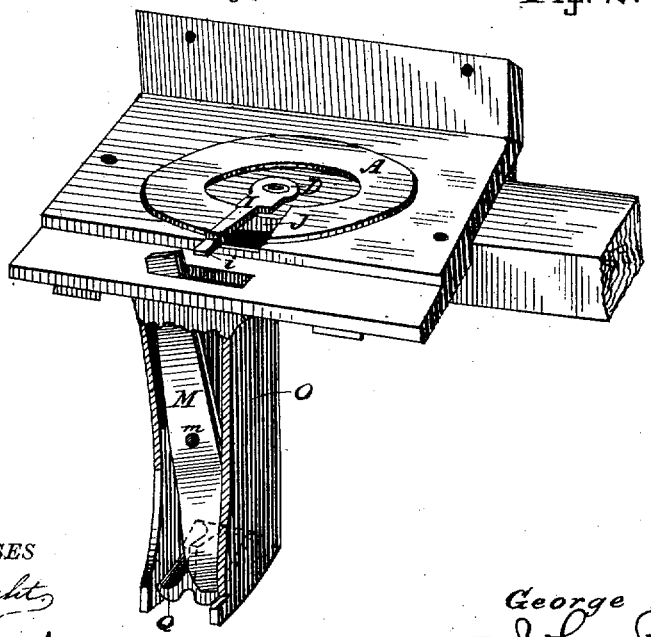
Figure 3:
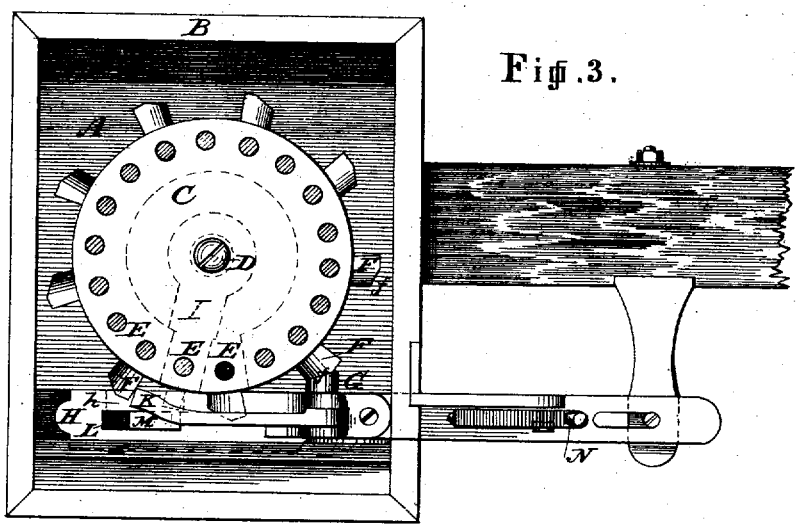
Figure 4:
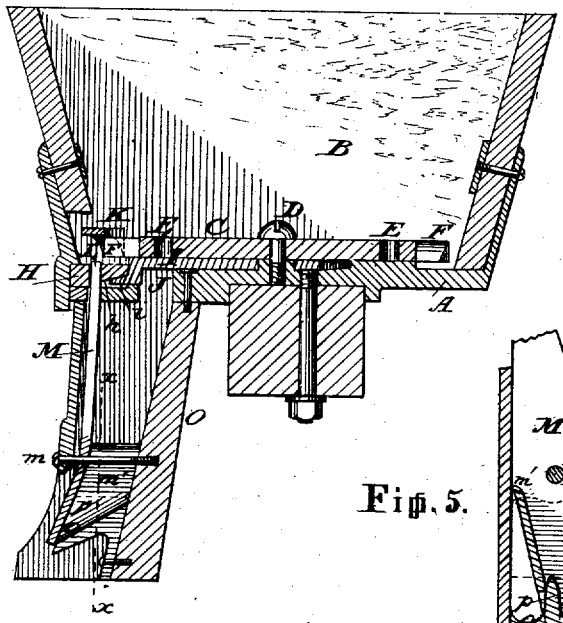
Figure 5:
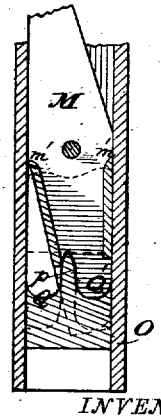

In the drawings, Figure 1 is a perspective view of the one seed-hopper containing my improvements, of which in practice there are two, the same as in an ordinary two-row corn-planter. Fig. 2 is a perspective view with the hopper, seed-disk, and reciprocating bar removed to show the slide. Fig. 3 is a plan of the seed-dropper. Fig. 4 is a cross-section of the same. Fig. 5 is a vertical section of the valve in the seed-tube through the line *x x*, Fig. 4.

A is a metallic or other suitable bottom, upon which the hopper B is built.

C is the horizontally-rotating seed-disk, which rotates upon D as an axis, and is provided near its periphery with a single row of seed-cups, E, equidistant from the center. The seed-disk C is provided with lugs or projections F at its periphery, there being two seed-cups E to every lug or projection F. The projections are slightly inclined or beveled at *f*, which come in contact with the lug G on the bar H, acting as a stop to arrest the rotation of the seed-disk.

I is a cut-off slide, situated under the seed-disk C, and moving on the same axis, and is provided with a foot, *i*, which foot engages with or takes into a slot or ratchet, *h*, on the under side of the reciprocating bar H, so that the cut-off slide I is caused to vibrate or oscillate within the opening J in the plate A by means of the reciprocating bar H, and at each throw thereof.

H is a reciprocating bar which extends across the machine, its purpose being to actuate the seed-disk C at either side of the machine, and it may be reciprocated by the hand-lever N or any other suitable means.

K is a pawl so situated and carried on the reciprocating bar H that when the bar is moved in the one direction the pawl K strikes against one of the lugs or projections F, causing a partial rotation of the seed-disk C, but when moved in the opposite direction it passes over the lug or projection F, immediately in the rear of the one previously acted upon, and then is in position to act upon said lug or projection at the next movement of the reciprocating bar H. It will be observed that precisely the opposite action takes place in the other hopper by reason of the pawl F at each end of the bar H being situated and carried in the same manner, but pointing in opposite directions.

M is a valve situated in the seed-tube O, pivoted at *m*, and having at its back two projections, *m′ m″*. In the lower part of the seed-tube O is secured a piece, P, which has a division-wall, *p*, and two oblique grooves, Q Q′, thus forming two channels from the seed-tube to the ground.

L is a slot or detent in the reciprocating bar H, into which the upper end of the valve engages, giving motion to said valve M at every throw of the reciprocating bar H, which causes the valve M to vibrate in such manner that it alternately opens and closes the grooves Q Q′ as the said valve M is vibrated by the reciprocating bar H, which allows a charge of seed to be received and held in the seed-tube, while at the same time a charge of seed is deposited in the ground.

J is an opening in the plate A, directly over the seed-tube, and where the cups to be discharged are brought, their discharge into the tube being governed by the movement of seed-disk C and cut-off slide I.

The operation is as follows: The reciprocating bar H being thrown to the left, the pawl K strikes one of the projections or lugs F and rotates the seed-disk one-ninth of a revolution—there being nine projections or lugs F, which is the number I prefer—which brings two seed-cups E over the place of discharge, J. This movement of the reciprocating bar H causes the right-hand end of the slot or detent *h* to engage with the foot *i* of the cut-off slide I, moving it to the left, and the right-hand end of the slot L to strike the top of the valve M, moving it to the left, while the lower end of the valve passes to the right, closing the mouth of the groove Q. The movement of the seed-disk C begins first, then the slide I and valve M simultaneously, all finishing their movement at the same instant. The momentum imparted to the seed-disk C by the reciprocating bar H and pawl K might cause it to rotate beyond the point desired; but the lug G, coming in contact with the inclined or beveled edge *f* of the projection or lug F, causes it to stop in exactly the proper position. By this action two full seed-cups E are brought directly over the opening or place of discharge, J, the rear seed-cup discharging into the seed-tube and being held in the groove Q by the valve M, while the forward seed-cup is prevented from discharging by the cut-off slide I, which acts as a bottom for said seed-cup. At the return-throw of the reciprocating bar H the seed-disk C remains stationary, the pawl K returning to its original position, the left-hand end of the slots or ratchets *h* and L engaging respectively the foot *i* of the cut-off slide I and upper end of the valve M, moving them both to the right hand, the lower end of the valve passing to the left, and closing the mouth of the groove Q′. This combined action causes the forward seed-cup to discharge the cut-off slide I, which acted as its bottom, having been moved to the left in the seed-tube, and held in the groove Q′ by the valve, while at the same time the charge held by the valve in the groove Q is discharged into the ground, and this action is continued so long as the machine is in operation.

In practice the ordinary caps and cut-offs are used over the seed-disks C, which are not shown in the drawings or referred to. Two seed-hoppers are used to each machine, precisely the same in construction, so that when the movement of the seed-disk causes discharge in the one the movement of the slide causes the discharge in the other, and vice versa.

What I claim is—

1. In combination with a seed-cup disk having an intermittingly-rotating motion in one direction imparted to it by a reciprocating bar, H, which acts upon it by its throw in one direction and allows it to remain at rest while its throw is effected in an opposite direction, a cut-off slide, I, adapted to move with the forward movement of the bar H and seed-cup disk and act as a bottom to a seed-cup, and to be removed from beneath said seed-cup by the backward movement of the bar H to allow the seed to be discharged from said cup.

2. In combination with an intermittingly-rotating seed-cup disk in which two seed-cups are brought beneath the cut-off at each movement of the disk, a sliding bottom adapted to hold the seed in one seed-cup while another discharges its seed, and to be moved from beneath the seed-cup which it closes to allow it to discharge its contained seed while the seed-cup disk is at rest.

3. In combination with the intermittingly-rotating seed-cup disk C and sliding seed-cup bottom I, the bar H, adapted to give a partial rotation to the disk C by its alternate throws and to move before its action on the slide I at each throw, so as to properly place, retain, and remove said slide in relation to one of the seed-cups.

4. In combination with the intermittingly-rotating seed-cup disk C and bar H, which acts upon it at alternate throws of the slide, the sliding seed-cup bottom I and valve M, arranged to operate in relation to each other and to the seed-cup disk, substantially as and for the purpose specified.

5. In combination with the seed-cup disk C and bar H, alternate throws of which act on said slide, a sliding seed-cup bottom located close beneath the seed-cup disk, and a vibrating valve located in the seed-tube, both of which are vibrated in one direction at each throw of the bar H, substantially as and for the purpose specified.

GEORGE W. BROWN.

Witnesses:
I. S. PERKINS,
LOREN STEVENS.